United States Patent Office 3,359,738
Patented Dec. 26, 1967

3,359,738
METHOD OF REDUCING SEEPAGE LOSS FROM CONTAINED BODIES OF WATER
Jack N. Dybalski, Chicago, and Charles W. Jonaitis, Kankakee, Ill., assignors to Armour and Company, Chicago, Ill., a corporation of Delaware
No Drawing. Filed Oct. 22, 1965, Ser. No. 502,505
10 Claims. (Cl. 61—1)

This invention relates to a method of reducing seepage loss from contained bodies of water. More particularly, the invention relates to the treatment of the base material in irrigation canals, ponds, reservoirs etc. to reduce or eliminate water seepage and/or erosion. This application is a continuation-in-part of our copending application Ser. No. 231,295, filed Oct. 17, 1962, now abandoned.

The need for impermeabilizing porous ground structures is particularly critical in irrigation systems. As much as fifty percent of the water passing through irrigation canals is lost through seepage. This is particularly true in areas where the irrigation canals are constructed on highly porous non-cohesive soils or subsoils such as sand. This tremendous loss of water in areas having very little rainfall or no access to a constant supply of water creates serious problems not only from an economic standpoint but from the standpoint of maintaining a sufficiently high standard of living for the inhabitants of the area.

In certain areas, it has been necessary to take drastic measures to impede the loss of water from irrigation canals through seepage. Such measures have included the lining of irrigation canals with brick. However, brick linings develop cracks due to hydraulic pressure fluctuation and shifting of the poorly compacted noncohesive sandy subsoil. In the west and southwest areas of the United States, asphalt beds have been employed to alleviate water losses. These beds are generally laid before water is permitted to flow through the canals and require special treatment and equipment, in addition to a substantial labor force to lay the asphalt. Beds prepared in this manner, like brick-lined beds, develop cracks and crevices which cannot be readily repaired by presently known methods.

Another serious problem aside from loss of water through seepage, is the problem of erosion of canals and riverbeds, and the like, caused by the flow of water through these systems carrying silt and particles of soil which eventually build up at bends in the beds. Erosion and collapse of the sides of retaining walls of such systems is also a common occurrence.

A great advance in solving the above problems was achieved by the method described in copending application Ser. No. 348,790, filed Mar. 2, 1964, now Patent No. 3,236,671 which was a continuation-in-part of application Ser. No. 108,287, filed May 8, 1961, now abandoned. With that method as with the method of this application, a cationic bituminous emulsion is introduced into the contained body of water, and subsequently the dispersed bituminous material deposits on the containing material with a consequent reduction in its permeability. However, under certain conditions and circumstances, it was found that the prior method was not as effective as would be desired. The deposited bituminous material sometimes was not distributed sufficiently over the entire surface of the containing material, tending to concentrate in certain areas to the exclusion of others. Also, it was found that the bituminous material penetrated the containing material to a considerable depth, and thus more was required for achieving a certain reduction in permeability than if the deposited material had been concentrated at the surface.

It is, therefore, an object of this invention to provide an improved method for treating the base material in irrigation canals, ponds, reservoirs etc. to reduce or eliminate water seepage and/or erosion. More specifically, it is an object to provide an improved process for depositing on the soil underlying a body of water a cohesive, relatively impermeable, highly erosion-resistant mat.

The foregoing objects are accomplished by the process of this invention which, briefly, comprises adding to a body of water an emulsion comprising a dispersed phase of a bituminous material in an aqueous phase and a minor amount sufficient to emulsify the bituminous material in the aqueous phase of a cationic emulsifying agent. The cationic bituminous emulsion, therefore, has a continuous aqueous phase, a dispersed bituminous phase, and a cationic emulsifier for the bituminous phase. Either before, after or during the addition of the emulsion, a suspension of particles of a portion of the porous, particulate base material underlying the body of water is formed in the body of water. The suspended particles of material are thereby at least partially coated with the bituminous material. Subsequently, the particles are allowed to redeposit on the remaining material underlying the body of water. These redeposited particles form a cohesive, relatively impermeable, highly erosion-resistant mat underlying the body of water.

An important feature of the foregoing method is the step of forming the suspension of the base material. To accomplish this, the base material is preferably agitated or stirred by some mechanical means over a substantial extent of its surface. For example, a mechanical rake or dredge can be used. Further, the agitation and suspension of the base material should not be very long delayed after the emulsion has been dispersed in the water, since it is of importance that the bituminous material contact the soil particles where the particles are suspended and the bituminous material is highly dispersed. Preferably, therefore, the bituminous emulsion is introduced into the water at about the same time as the containing material is agitated. In one embodiment, the agitation of the base material and the dispersion of the emulsion are carried out concurrently.

The cationic emulsifying materials which may be used in the practice of this invention include known cationic agents such as N-alkyl polymethylene diamines, N-alkyl polymethylene mono- and polyethoxylated diamines, N-alkyl mono- and diethoxylated mono-amines, amido amines, heterocyclic amines and alkyl and alkyl polyethoxylated quaternary and diquaternary ammonium compounds.

The N-alkyl polymethylene diamines which may be used in the practice of this invention may be represented by the general formula $RNH(CH_2)_wNH_2$ wherein R is an aliphatic hydrocarbon radical having from 8 to 22 carbon atoms and $w$ is an integer of from 2 to 4. Such compounds may be prepared by alkylating polymethylene diamines.

The N-alkyl polymethylene mono- and polyethoxylated diamines which may be used as the cationic material may be represented by the general formula:

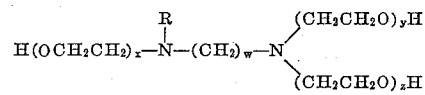

wherein R is an aliphatic hydrocarbon radical having from 8 to 22 carbon atoms, $w$ is an integer from 2 to 4 and $x$, $y$ and $z$ are integers from 0 to 20 and the total of $x$, $y$ and $z$ is a positive value which does not exceed 20. These compounds may be formed by condensing an N-alkyl polymethylene diamine with from 1 to 20 moles of ethylene oxide. The break-time of the emulsions can be slowed by increasing the ethylene oxide content. It is preferred that from 2 to 10 ethylene oxide moieties be present in each molecule of the ethoxylated diamine.

The N-alkyl mono- and diethoxylated mono-amines which may be used in the practice of this invention may be represented by the general formula:

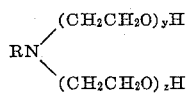

wherein R is an aliphatic hydrocarbon radical having from 8 to 22 carbon atoms, y and z are integers from 0 to 20 and the total of y and z is a positive value which does not exceed 20. These compounds may be formed by condensing an N-alkyl amine (i.e., a primary amine) with from 1 to 20 moles of ethylene oxide.

The amido-amines and heterocyclic amines which may be used as the cationic agents in the practice of this invention also preferably contain an N-substituted aliphatic hydrocarbon radical containing from 8 to 22 carbon atoms. Examples of amido-amines and heterocyclic amines which may be used are diethylene triamine amidoamine, N-amino ethyl imidazolines, N-amino ethyl piperazines, glyoxalidines and oxazolines. It is preferred that the heterocyclic amines contain at least two active amino nitrogens.

The alkyl and alkyl polyethoxylated quaternary and diquaternary ammonium compounds which may be used in the practice of this invention are represented by the general formula:

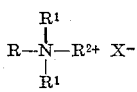

in which R is an aliphatic hydrocarbon radical having from 8 to 22 carbon atoms, $R^1$ is a member selected from the group consisting of lower alkyl and groups of the formula:

$$(CH_2CH_2O)_nH$$

wherein $n$ is an integer from 1 to 20, $R^2$ is a lower alkyl radical and a trimethylene tertiary amine radical

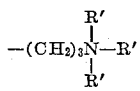

and X is an anion such as $NO_3^-$, $Cl^-$, $OH^-$ or $Br^-SO_4^-$. These compounds may be prepared in general by the reaction of an alkyl halide with a tertiary amine or diamine.

Examples of aliphatic hydrocarbon radicals (R in the above formulae) include octyl, nonyl, decyl, undecyl, dodecyl, tridecyl, tetradecyl, pentadecyl, hexadecyl, heptadecyl, octadecyl, eicosyl, docosyl, octadecenyl, octadecodienyl, octadecatrienyl and mixtures of hydrocarbon radicals such as are contained in tallow, soybean oil, tall oil, resin, rosin etc. In the preferred embodiments of this invention, the hydrocarbon radicals (or R groups) are such as are contained in tallow, coconut oil or soybean oil. These radicals are usually mixtures of hydrocarbon groups. For example, tallow comprises a mixture of dodecyl, tetradecyl, tetradecenyl, hexadecyl, hexadecenyl, octadecyl, octadecenyl, octadecadienyl, eicosyl and eicosenyl groups. Coconut oil comprises a mixture of octyl, decyl, dodecyl, tetradecyl, hexadecyl, octadecyl, octadecenyl and octadecadienyl groups. Soybean oil comprises a mixture of hexadecyl, octadecyl, octadecenyl and octadecadienyl groups. Hereinafter, terms such as "tallow," "coco" and "soya" refer to the respective mixtures of groups contained in compounds such as tallow, coconut oil and soybean oil.

When the cationic material is an amine, it is preferred to utilize it in the emulsion in combination with an acid. The acid used may be a carboxylic acid such as formic acid, acetic acid, propionic acid etc., sulfonic acid such as benzene sulfonic acid; or a mineral acid such as hydrochloric, nitric, sulfuric, perchloric, hypochlorous etc. The amount of acid used may vary from above 0.1% to about 5.0% based on the weight of the emulsion with from about 0.2% to about 1.0% being the preferred range. When an acid is used in combination with an amine in the emulsion, the corresponding acid salt of the amine is formed. A preformed acid salt of an amine may also be used as the cationic material.

When using an alkyl or alkyl polyethoxylated quaternary ammonium compound as the cationic material, it is generally not necessary to incorporate an acid into the emulsion. However, addition of an acid may be desirable in order to adjust the pH of the emulsion.

The cationic materials may be used either alone or in combination with one another in the practice of this invention. The amount of cationic material which is used in the emulsion should be sufficient to emulsify the bituminous binder in the aqueous phase. Generally, the amount of cationic material used will vary between about 0.1% to 2.0% based on the weight of the emulsion. When the body of water to which the emulsion is added contains a large amount of anions in solution which may have an adverse effect on the action of the emulsion, such carbonate or bicarbonate ions, a larger amount of cationic material may be necessary in order to maintain a discrete particle suspension of the emulsion.

Bituminous materials which may be used in the practice of this invention include bitumen, natural asphalt, petroleum still residues of paving grade, plastic residues from coal tar distillation, petroleum pitch, solutions of said substances by cutback asphalt, mineral waxes, and the like. The preferred bituminous material is asphalt of the paving grade having a penetration between 40 and 300 as determined by ASTM test No. D5–25, "Penetration of Bituminous Materials."

The amount of bituminous binder used in the emulsion will generally be between about 20% and about 80%, based on the weight of the emulsion and is preferably from about 50% to about 70% by weight. Various modifying agents may also be added to the emulsion to increase the storage stability of the emulsion.

The cationic emulsifier may be added to the bituminous binder or to the aqueous phase. However, it is preferred to add it to the aqueous phase. A satisfactory method of preparing the emulsions in the practice of this invention is to maintain the bituminous material at a temperature of from 180° F. to about 350° F., the preferred temperature being about 250° F. The cationic emulsifier and modifying material, if any, may then be added to the continuous water phase which is maintained at a temperature of from about 32° F. to about 212° F. and preferably from about 115° F. to about 125° F. The aqueous solution containing the cationic emulsifier may then be blended with the bituminous binder. It is preferred to agitate the composition during the blending such as by means of a homogenizer.

The particle size of the emulsions which may be utilized in the practice of this invention is not particularly critical. Generally, the particle size will range from between 0.5 micron to 100 microns in diameter. It is preferred to use an emulsion having a particle size of less than 10 microns.

The pH of the emulsions used in the practice of this invention may range from about 1 to about 10, with a range of from about 2 to about 7.0 being preferred. The emulsions are generally somewhat more stable and possess better viscosity characteristics when the pH is on the acid side. However, neutral or alkaline emulsions may also be used.

In another embodiment of this invention a coagulant or flocculating agent, such as a polymer of acrylamide, guar gum, gelatin, carboxymethylcellulose, cationic starch, cationic cellulose emulsion before it is added to the body of water containing suspended particles of base material. The mixture of asphalt emulsion and coagulant or flocculating agent is agitated to insure complete dispersion of the latter in the former. The addition of a coagulant or flocculating agent to the asphalt emulsion results in an agglomeration of the fines when the emulsion is added to the body of water containing suspended particles of base materials at the same time the fines are coated with the bituminous material. This allows a more complete utilization of the emulsion. The amount of coagulant of flocculating agent which may be used may vary from about 0.0001% to about 2.0% based on the weight of the emulsion.

Inorganic acids, salts and oxides, such as $CaSO_4$, $Fe_3O_4$, $Na_2SO_4$, $Na_2HPO_4$, $H_3PO_4$, $H_2SO_4$, $FeCl_3$, $CrCl_3$, etc., may be used to provide better and/or more rapid adhesion of the bituminous material to some soils. The base material in the body of water to be treated with the bituminous emulsion may be pretreated with the inorganic material by adding the inorganic material to the body of water. Alternatively, the inorganic material may be added to the emulsion prior to adding the emulsion to the body of water. The amount of inorganic material used may vary from about 0.001% to about 1.0% based on the weight of the emulsion.

After the emulsion is prepared, it is added to a body of water in which it is desired to reduce or eliminate water seepage and/or erosion such as an irrigation canal, pond, reservoir, etc. The emulsion may be introduced into the body of water by any suitable means such as hosing, pumping, spraying or dumping. It may be introduced either below or above the surface of the water. In a body of water having a large area, it is preferred to add the emulsion at several separated points to insure adequate distribution of the emulsion in the body of water. The emulsion is dispersed in such manner as to form in the body of water a dispersion of the bituminous phase of greatly increased dilution as compared with that of the emulsion. The amount of emulsion which is introduced into the body of water preferably is sufficient to provide from about 0.65 to about 10.4 pounds of asphalt per square yard of surface area of the base material.

The base material which underlies the body of water may be a soil of any type such as siliceous sand, calcareous sand, silt, clay gravel or combinations of these. Prior to, during or subsequent to the introduction of the emulsion to the body of water, a suspension of particles of a portion of the base material is formed. This may be accomplished by agitating the base material by a suitable mechanical means such as with a rake, dredge, etc. It is preferred that the base material be agitated or stirred to a depth of from ¼ to 10 inches in order to form a suspension of this material.

The cationically emulsified asphalt at least partially coats the suspension of particles of the base material. This asphalt coating forms a strong bond with the surface of the particles. Subsequently, the particles are allowed to redeposit on the remaining underlying soil in the form of a cohesive relatively impermeable, highly erosion-resistant mat. This redeposition of the treated particles of base material occurs spontaneously.

When the base material underlying the body of water is highly permeable to begin with, it is sometimes advantageous to introduce another portion of emulsion into the body of water after the particles of base material which have been coated with the first portion of emulsified bituminous material have redeposited. This results in the formation of a layer of pure bituminous material on top of the coated soil mat.

The following examples further illustrate this invention. In these examples the term "Duomeen" is a trademark employed in connection with N-alkyl trimethylene diamines and the letter T indicates that the alkyl group comprises a mixture of hydrocarbon groups derived from tallow; "Arquad" is a trademark employed in connection with N-alkyl quaternary ammonium chlorides, T has the same meaning as above, and 50 is a grade designation; "Ethomeen 2C/25" is a trademark employed in connection with tertiary amines having two fatty alkyl groups and fifteen polyoxyethylene groups attached to the nitrogen; "Ethomid 0/15" is a trademark employed in connection with a fatty acid amide having five polyoxyethylene groups attached to the nitrogen; and "Duoquad T–50" is a trademark employed in connection with a derivative of Duomeen T in that the diamine is diquaternized to form the corresponding diquaternary, i.e.

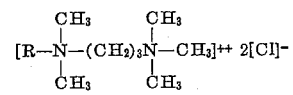

T has the same meaning as above, and 50 is a grade designation.

*Example I*

An aqueous emulsion was prepared by homogenizing 0.9% by weight of "Duoquad T," 0.1% by weight of "Ethomid 0/15," 0.1% $CaCl_2$, 65% by weight of asphalt, and 35% by weight of water. Kerosene (5–10%) was added to the finished emulsion. Soil contained in a 7.5-inch diameter plexiglass cylinder, which was covered with approximately a 6-inch head of water, was artificially agitated with a spatula to a depth of about 1 inch to effect a suspension of the soil in the water. An amount of the above emulsion equal to 0.1 gram of asphalt per square inch of surface soil (6.8 grams of emulsion) was added with milk agitation to the water containing the suspended soil. As the diluted asphalt droplets contacted the suspended soil particles and coated them, they dropped to the original soil bed and began to form a mat of asphalt coated soil. As the mat became more cohesive, the soil surface was sealed against seepage. A second application of the emulsion was made to the water after the coated soil settled. This also deposited but only on top of the coated soil mat as a layer of pure asphalt. The thus treated soil was highly impermeable and erosion-resistant.

*Example II*

Six inches of water was ponded over 8 inches of soil in a vessel. An emulsion comprising 0.9% by weight of "Duoquad T," 0.1% by weight of "Ethomid 0/15," 65.8% by weight of asphalt and 34.2% by weight of water was added to the static head of water in the vessel, in an amount equal to 0.1 gram of asphalt per square inch of surface soil (approximately 0.15 gram of emulsion). The water was agitated to insure dispersion of the emulsion in the water. The underlying soil was agitated to a depth of approximately 1 inch with sufficient force to obtain temporary suspension of the top 1 inch of soil in the water. The asphalt adhered to the particles of suspended soil and the coated particles dropped down on the clean soil surface in the form of a coated soil mat. After 24 hours of standing statically, the mat became quite cohesive, reduced seepage to zero, and was very resistant to puncture.

*Example III*

The process of Example II was repeated with the sole exception that the emulsion which was added to the static head comprised 65% by weight of asphalt, 35% by weight of water, 0.8% by weight of "Duomeen T," 0.2% by weight of "Ethomeen 2C/25," 0.45% by weight of HCl, and 0.1% by weight of $CaCl_2$.

*Example IV*

The process of Example II was repeated with the sole exception that the emulsion which was added to the static head of water comprised 65% by weight of asphalt, 35% by weight of water, 1.0% by weight of "Arquad T–50," and 0.1% by weight of $CaCl_2$.

*Example V*

The process of Example II was repeated with the sole exception that the emulsion which was added to the static head of water comprised 56% by weight of asphalt, 35% by weight of water, 1% by weight of "Duoquad T–50," and 0.1% by weight of CaCl₂.

The layers of soil underlying the head of water which were treated in accordance with the procedures described in Examples III, IV and V, were cohesive, impermeable and highly erosion- resistant.

*Example VI*

An asphalt emulsion was prepared by admixing 0.9% by weight of "Duoquad T," 0.1% by weight of "Ethomid 0/15," 65% by weight of asphalt, and 34% by weight of water. To this emulsion there was added 10% by weight of Separan 2610 (a 0.5% by weight aqueous solution of an acrylamide polymer available from Dow Chemical Company). The mixture of asphalt emulsion and Separan solution was agitated thoroughly to insure complete dispersion of the Separan in the emulsion. The soil underlying an 8-inch head of water was agitated to form a suspension of the upper 1-inch layer of soil particles in the water and the emulsion was added to the suspension in an amount sufficient to coat the finely divided particles of soil in suspension. The fines were agglomerated at the same time they were coated. This resulted in a more complete utilization of the emulsion. As the agglomerated fines dropped to the original soil bed, they formed a mat of asphalt-coated soil agglomerates. This mat was highly cohesive and impermeable.

While this invention has been described and exemplified in terms of its preferred embodiments, those skilled in the art will appreciate that modifications can be made without departing from the spirit and scope of the invention.

We claim:

1. In the storage and utilization of water where a containing base material underlying a contained body of water is subject to seepage loss characterized by the steps of:
    (a) agitating the base material underlying the body of water and removing portions thereof;
    (b) distributing said removed portions of said material in said body of water to form a suspension therein of particles of said material over the remaining portion of said base material;
    (c) contacting said suspended particles of material with the dispersed bituminous phase of an aqueous cationic bituminous emulsion to at least partially coat said particles with said bituminous phase and
    (d) allowing said coated particles to redeposit on the remaining portion of said base material beneath said body of water to form thereover a new containing surface layer of reduced permeability.

2. The method of claim 1 wherein said material is soil.

3. The method of claim 1 wherein said bituminous emulsion consists essentially of a continuous aqueous phase, a dispersed asphalt phase and a cationic emulsifier for said asphalt phase.

4. The method of claim 1 wherein said cationic emulsifier is selected from the class consisting of water-soluble salts of polyamine compounds and quaternary ammonium compounds, said polyamine and said quaternary compounds containing an aliphatic hydrocarbon group of from 8 to 22 carbons.

5. In the storage and utilization of water where a contained body of water is subject to loss by seepage through the containing surface of a base of a porous particulate soil underlying said body, the method of reducing seepage loss characterized by the steps of:
    (a) mechanically agitating said base soil underlying the body of water and removing portions thereof;
    (b) distributing said removed portions of said soil in said body of water to form a suspension therein of particles thereof over the remaining portion of said base soil;
    (c) contacting said suspended particles with the dispersed bituminous phase of an aqueous cationic bituminous emulsion to at least partially coat said particles with said bituminous phase; and
    (d) allowing said coated particles to redeposit on the remaining portions of said base soil beneath said body of water to form thereof a new containing surface layer of reduced permeability.

6. The method of claim 5 wherein said bituminous emulsion consists essentially of a continuous aqueous phase, a dispersed asphalt phase and a cationic emulsifier for said asphalt phase.

7. The method of claim 5 wherein said cationic emulsifier is selected from the class consisting of water-soluble salts of polyamine compounds and quaternary ammonium compounds, said polyamine and said quaternary compounds containing an aliphatic hydrocarbon group of from 8 to 22 carbons.

8. In the storage and utilization of water where a contained body of water is subject to loss by seepage through the containing surface of a base of a porous particulate material underlying said body the method of reducing seepage loss characterized by the steps of:
    (a) agitating said base material underlying said body of water and removing portions thereof;
    (b) distributing said removed portions of said underlying material in said body of water to form a suspension therein of particles of said material over the remaining portion of said base material;
    (c) contacting said suspended particles of material with the dispersed bituminous phase of an aqueous cationic bituminous emulsion to at least partially coat said particles with said bituminous phase;
    (d) allowing said coated particles to redeposit on the remaining portion of said base material beneath said body of water to form thereover a new containing surface layer of reduced permeability; and
    (e) subsequently dispersing in said body of water an additional quantity of an aqueous cationic bituminous emulsion for depositing on said new containing surface layer to further reduce its permeability.

9. The method of claim 8 wherein said base material is soil, and wherein both of said bituminous emulsions consist essentially of a continuous aqueous phase, a dispersed asphalt phase and a cationic emulsifier for said asphalt phase.

10. The method of claim 9 wherein both of said cationic emulsifiers are selected from the class consisting of water-soluble salts of polyamine compounds and quaternary ammonium compounds, said polyamine and said quaternary compounds containing an aliphatic hydrocarbon group of from 8 to 22 carbons.

References Cited

UNITED STATES PATENTS

| | | | |
|---|---|---|---|
| 2,190,003 | 2/1940 | Van Hulst | 61—36 |
| 2,201,459 | 5/1940 | Van Hulst | 61—36 |
| 3,108,441 | 10/1963 | Watson | 61—36 |
| 3,118,832 | 1/1964 | Katzer et al. | 61—36 X |
| 3,124,934 | 3/1964 | Glenn et al. | 61—36 |
| 3,236,671 | 2/1966 | Dybalski et al. | 61—36 X |
| 3,252,290 | 5/1966 | Gagle et al. | 61—36 |

OTHER REFERENCES

The Oil Gas Journal; p. 54; June 5, 1961.

EARL J. WITMER, *Primary Examiner*.